United States Patent
Watanabe et al.

(10) Patent No.: US 10,734,917 B2
(45) Date of Patent: Aug. 4, 2020

(54) POWER CONVERSION DEVICE AND POWER CONVERSION METHOD

(71) Applicant: KABUSHIKI KAISHA YASKAWA DENKI, Kitakyushu-shi, Fukuoka (JP)

(72) Inventors: Satoshi Watanabe, Fukuoka (JP); Taisuke Katayama, Fukuoka (JP)

(*) Notice: Subject to any disclaimer, the term of this patent is extended or adjusted under 35 U.S.C. 154(b) by 0 days.

(21) Appl. No.: 16/195,444

(22) Filed: Nov. 19, 2018

(65) Prior Publication Data
US 2019/0319550 A1     Oct. 17, 2019

(30) Foreign Application Priority Data
Apr. 13, 2018 (JP) .................. 2018-077533

(51) Int. Cl.
*H02M 7/537* (2006.01)
*H02M 1/08* (2006.01)
*H02M 1/14* (2006.01)
*H02M 1/00* (2006.01)

(52) U.S. Cl.
CPC ............ *H02M 7/537* (2013.01); *H02M 1/08* (2013.01); *H02M 1/143* (2013.01); *H02M 2001/0038* (2013.01)

(58) Field of Classification Search
CPC ...................................... H02M 7/53
See application file for complete search history.

(56) References Cited

U.S. PATENT DOCUMENTS

| | | | | |
|---|---|---|---|---|
| 6,225,791 B1* | 5/2001 | Fujii | ............ | H02J 3/1814 323/207 |
| 9,774,246 B2* | 9/2017 | Wang | ............ | H02M 7/219 |
| 2014/0001990 A1* | 1/2014 | Takamatsu | ............ | H02P 27/08 318/400.22 |
| 2018/0292255 A1* | 10/2018 | Miklosovic | ............ | H02P 6/10 |

FOREIGN PATENT DOCUMENTS

JP    H7-135797    5/1995

* cited by examiner

*Primary Examiner* — Daniel Kessie
*Assistant Examiner* — Trinh Q Dang
(74) *Attorney, Agent, or Firm* — Soei Patent & Law Firm

(57) ABSTRACT

A power conversion device includes three inverters configured to convert DC power of DC buses into single-phase AC power, and a controller configured to control the three inverters so as to generate three-phase AC power. The controller is configured to generate a fundamental wave command for generating one-phase AC power constituting the three-phase AC power, and to generate an adjustment wave command having triple the frequency of the fundamental wave command. Additionally, the controller is configured to output a phase voltage command, in which the adjustment wave command is superimposed on the fundamental wave command, and to determine an initial phase of the adjustment wave command to be offset from an initial phase of the fundamental wave command so as to reduce a voltage ripple occurring in the DC buses at double the frequency of the fundamental wave command.

16 Claims, 11 Drawing Sheets

Fig.10

Generate a fundamental wave command for generating one-phase AC power of three-phase AC power for each of three inverters configured to convert DC power of a DC bus into single-phase AC power, the fundamental wave command having a fundamental frequency ~210

Determine an initial phase of the adjustment wave command to be offset from an initial phase of the fundamental wave command so as to reduce a voltage ripple occurring in the DC bus at double the fundamental frequency of the fundamental wave command ~215

Generate, for each of the three inverters, an adjustment wave command having triple the fundamental frequency of the fundamental wave command ~220

Output, for each of the three inverters, a phase voltage command, in which the adjustment wave command is superimposed on the fundamental wave command ~225

Modify an amplitude of the adjustment wave command based on the amplitude of the fundamental wave command so as to further reduce the voltage ripple ~230

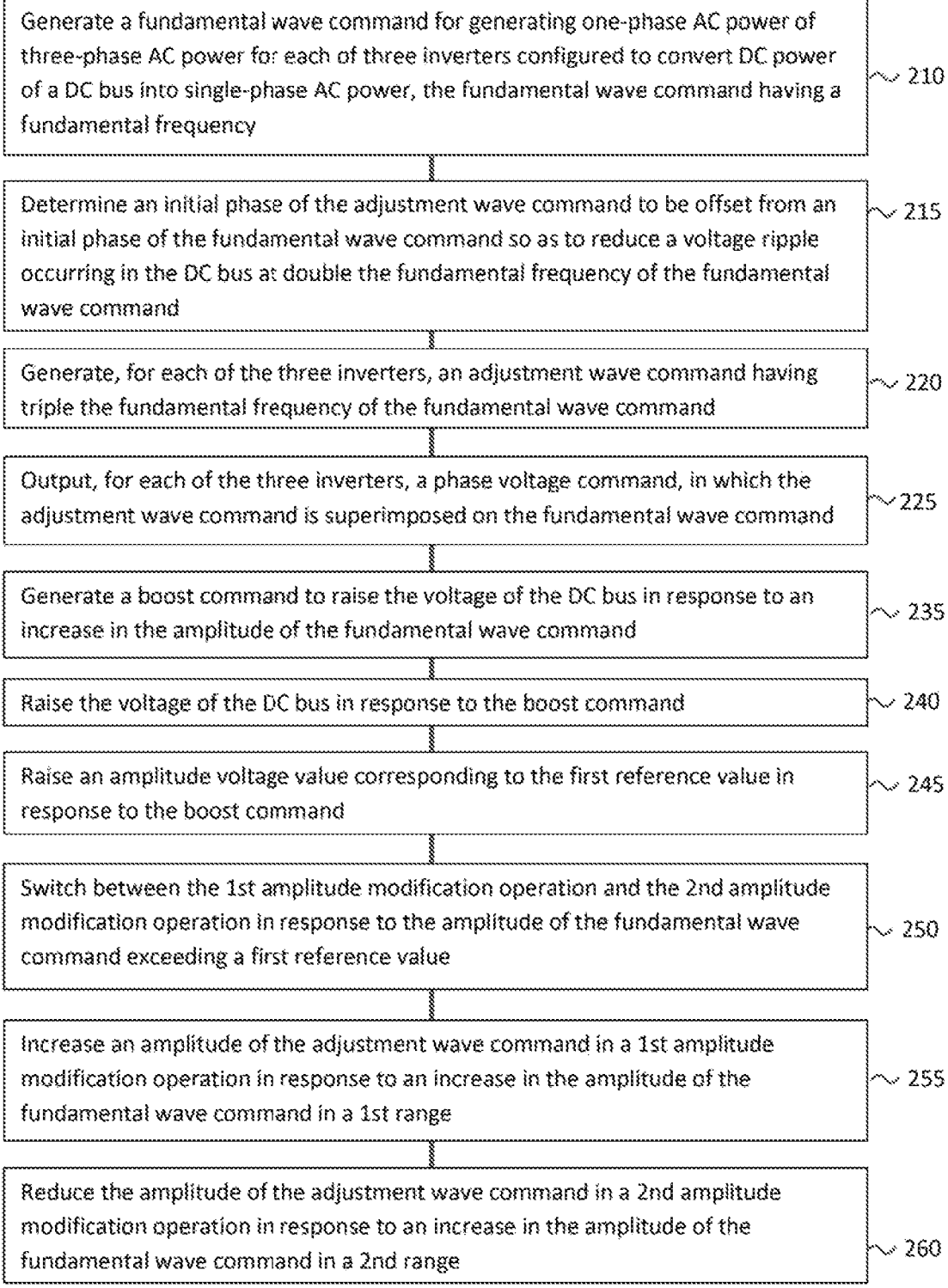

POWER CONVERSION DEVICE AND POWER CONVERSION METHOD

CROSS-REFERENCE TO RELATED APPLICATION

This application is based upon and claims the benefit of priority from Japanese Patent Application No. 2018-077533, filed on Apr. 13, 2018, the entire contents of which are incorporated herein by reference.

BACKGROUND

1. Field

The present disclosure relates to a power conversion device and a power conversion method.

2. Description of the Related Art

Japanese Unexamined Patent Publication No. H7-135797 discloses a so-called multiple inverter which increases the output capacity by combining the outputs of a plurality of inverters.

SUMMARY

A power conversion device according to one aspect of the present disclosure includes: three inverters each of which is configured to convert DC power of a DC bus into single-phase AC power; and a controller configured to control the three inverters so as to generate three-phase AC power. The controller may include a fundamental wave generation module configured to generate a fundamental wave command for generating one-phase AC power constituting the three-phase AC power for each of the inverters, and an adjustment wave generation module configured to generate an adjustment wave command having triple the frequency of the fundamental wave command for each of the inverters. Additionally, the controller may include a command output module configured to output a phase voltage command, in which the adjustment wave command is superimposed on the fundamental wave command, for each of the inverters, and a phase calculation module configured to calculate a phase of the adjustment wave command based on a power factor of the three-phase AC power so as to reduce a voltage ripple occurring in the DC bus at double the frequency of the fundamental wave command.

A power conversion method according to another aspect of the present disclosure includes generating a fundamental wave command for generating one-phase AC power of three-phase AC power for each of three inverters, such that the three-phase AC power is generated in the three inverters configured to convert DC power of a DC bus into single-phase AC power, and generating an adjustment wave command having triple the frequency of the fundamental wave command for each of the inverters. Additionally, the method may include outputting a phase voltage command, in which the adjustment wave command is superimposed on the fundamental wave command, for each of the inverters, and calculating a phase of the adjustment wave command with respect to the fundamental wave command based on a power factor of the three-phase AC power so as to reduce a voltage ripple occurring in the DC bus at double the frequency of the fundamental wave command.

BRIEF DESCRIPTION OF THE DRAWINGS

FIG. 10 is a flow chart illustrating an example power conversion method for generating AC power; and FIG. 11 is a flow chart illustrating another example power conversion method for generating AC power.

DETAILED DESCRIPTION

Figure 1:
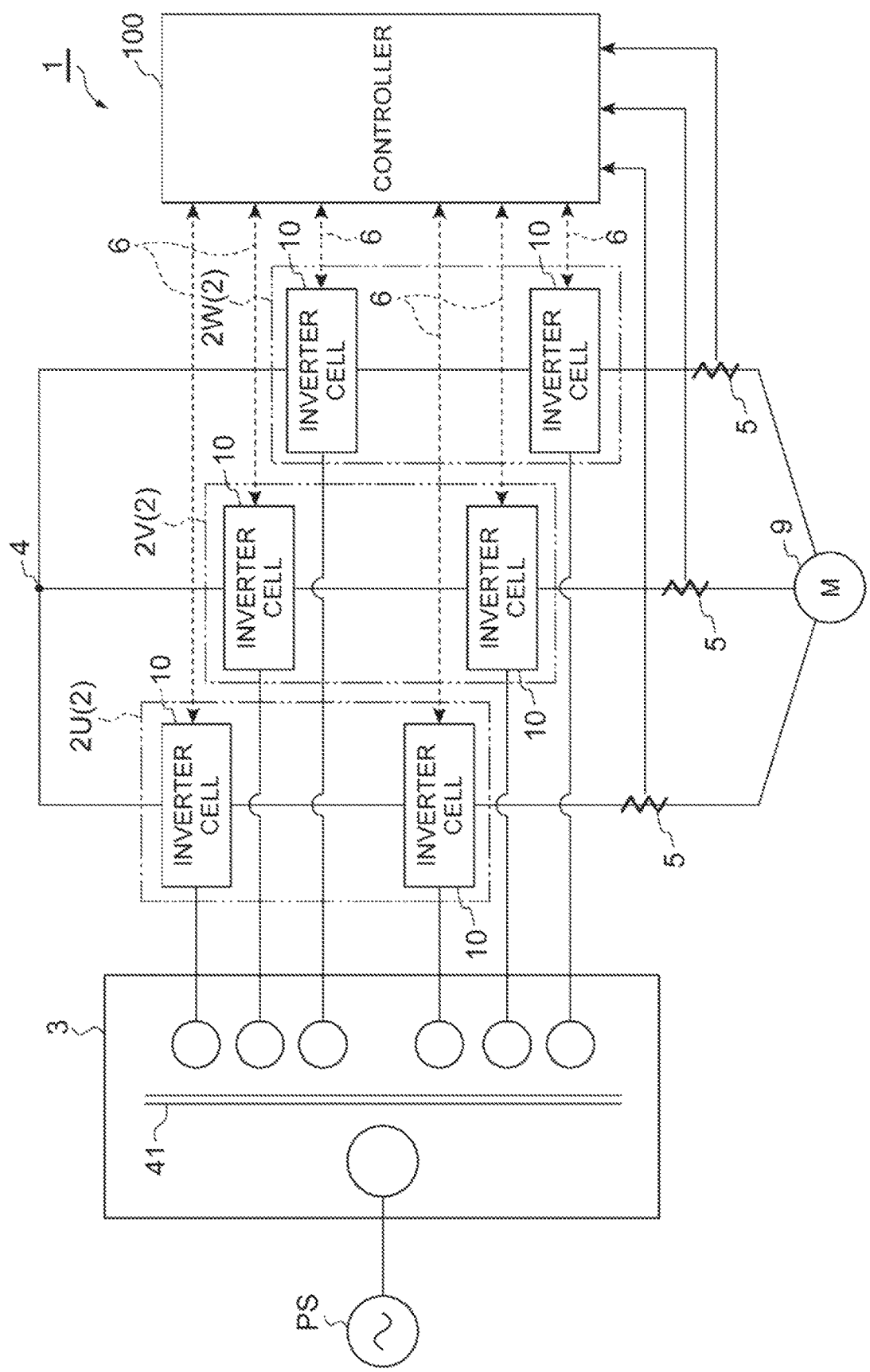
FIG. 1 is a schematic diagram illustrating an overall configuration of a power conversion device.

Hereinafter, embodiments will be described in detail with reference to the drawings. The same elements or the elements having the same function are denoted by the same reference numerals and a redundant description thereof will be omitted.

(Power Conversion Device)

A power conversion device 1 illustrated in FIG. 1 is a system for generating three-phase AC power to be supplied to a load of an electric motor or the like. The power conversion device 1 includes three inverters 2 and a controller 100. Each of the three inverters 2 converts DC power of a DC bus into single-phase AC power and supplies the single-phase AC power to a load (for example, an electric motor 9) as one phase of three-phase AC power. Hereinafter, the inverters 2 for U-phase, V-phase, and W-phase are separately referred to as an inverter 2U, an inverter 2V, and an inverter 2W, respectively. For example, the U-phase inverter 2U supplies the single-phase AC power to the electric motor 9 as the U-phase AC power, the V-phase inverter 2V supplies the single-phase AC power to the electric motor 9 as the V-phase AC power, and the W-phase inverter 2W supplies the single-phase AC power to the electric motor 9 as the W-phase AC power. One AC output terminal of each of the inverters 2U, 2V, and 2W is connected to the electric motor 9, and the other AC output terminal of each of the inverters 2U, 2V, and 2W is connected to each other. The connection point between the inverters 2U, 2V, and 2W corresponds to a neutral point 4 of the three-phase AC power. A three-phase AC current flowing into the electric motor 9 is detected by a current detector 5, and a detection signal is input to the controller 100. In some examples, the current detectors 5 may be provided to all three-phases. In other examples, the current detector 5 may be provided in two of the three phases, and the current value of the remaining one phase may be calculated by the controller 100.

The electric motor 9 may comprise synchronous electric motors (including surface permanent magnet motors (SPMM), interior permanent magnet motors (IPMM)), induction motors, other types of AC electric motors, or any combination thereof. In addition, the electric motor 9 may comprise a rotary electric machine type motor, a linear motor, a power generator, or any combination thereof.

Each of the inverters 2U, 2V, and 2W may be a series connected multi-level inverter in which the AC sides of a plurality of inverter circuits are connected in series. For example, each of the inverters 2U, 2V, and 2W may include a plurality of inverter cells 10 connected in series between the neutral point 4 and the electric motor 9. If the plurality of inverter cells 10 are connected in series to each other, the AC sides of inverter circuits 12 (described later) respectively included in the inverter cells 10 are connected in series to each other.

The controller 100 controls the inverters 2U, 2V, and 2W so as to generate the three-phase AC power. For example, the controller 100 controls the plurality of inverter cells 10 of the inverter 2U so as to generate the single-phase AC power for the U phase, controls the plurality of inverter cells 10 of the inverter 2V so as to generate the single-phase AC power for the V phase, and controls the plurality of inverter cells 10 of the inverter 2W so as to generate the single-phase AC power for the W phase. The controller 100 and each inverter cell 10 are connected by communication links 6. In a case where the inverters 2U, 2V, and 2W are series connected multi-level inverters, optical communication devices or the like may be used as the communication links 6 so as to electrically insulate the controller 100 and the inverter cells 10 from each other. Hereinafter, example configurations of the inverter cells 10 and the controller 100 will be described in further detail.

(Inverter Cell)

Figure 2:
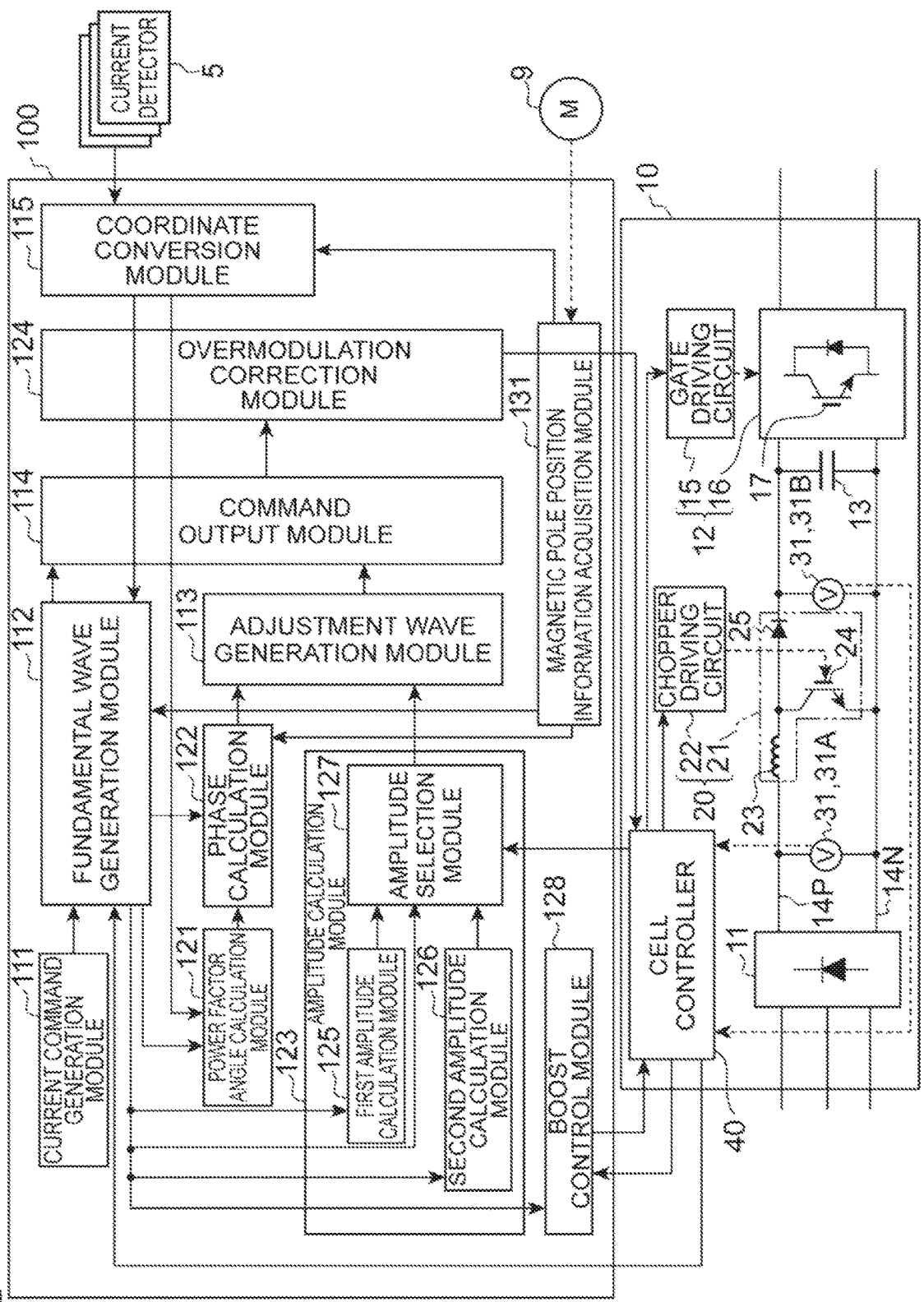
FIG. 2 is a schematic diagram illustrating a configuration of an inverter cell and a controller.

The inverter cell 10 converts AC power supplied from an AC power source into single-phase AC power for driving the electric motor 9. As illustrated in FIG. 2, the inverter cell 10 includes a rectifier circuit 11, an inverter circuit 12, a capacitor 13, a voltage detector 31, and a cell controller 40.

The rectifier circuit 11 is, for example, a diode bridge circuit, and converts AC power from the AC power source into DC power and outputs the DC power to the DC buses 14P and 14N. The capacitor 13 is connected between the DC buses 14P and 14N and smoothes the DC voltage between the DC buses 14P and 14N.

The inverter circuit 12 is a circuit which converts DC power of the DC buses 14P and 14N into single-phase AC power. The inverter circuit 12 includes a switching circuit 16 and a gate driving circuit 15. The switching circuit 16 includes a plurality of switching elements 17 (for example, four switching elements) and converts DC power into AC power by switching on/off the switching elements 17. The switching element 17 is, for example, a power metal oxide semiconductor field effect transistor (MOSFET), an insulated gate bipolar transistor (IGBT), or the like, and switches on/off in accordance with a gate driving signal. While insulating the cell controller 40 from the switching circuit 16, the gate driving circuit 15 converts the gate driving signal input from the cell controller 40 into a signal form capable of driving the switching element 17 of the switching circuit 16 and outputs the signal to the switching element 17.

The voltage detector 31 detects a DC voltage between the DC buses 14P and 14N.

The cell controller 40 provides input and output via signal communications with the controller 100 and performs control processing of each part of the inverter cell 10. For example, the cell controller 40 generates the gate driving signal in response to a command (for example, a phase voltage command) from the controller 100, and outputs the gate driving signal to the gate driving circuit 15. In addition, the cell controller 40 acquires the detection result of the voltage detector 31 and outputs the detection result to the controller 100 as necessary.

(Controller)

The controller 100 is configured to generate a fundamental wave command for generating one-phase AC power of three-phase AC power for each of the inverters 2U, 2V, and 2W so as to cause the inverters 2U, 2V, and 2W to generate three-phase AC power. Additionally, the controller 100 is configured to generate an adjustment wave command having triple the frequency of the fundamental wave command for each of the inverters 2U, 2V and 2W, and output a phase voltage command, in which the adjustment wave command is superimposed on the fundamental wave command, for each of the inverters 2U, 2V, and 2W. Still further, the controller 100 is configured to calculate the phase of the adjustment wave command based on the power factor of the three-phase AC power so as to reduce the voltage ripple occurring in the DC buses 14P and 14N at double the frequency of the fundamental wave command.

For example, the controller 100 may include, as a functional configuration (hereinafter referred to as a "function module"), a current command generation module 111, a fundamental wave generation module 112, an adjustment wave generation module 113, a command output module 114, a coordinate conversion module 115, a power factor angle calculation module 121, a phase calculation module 122, an amplitude calculation module 123, and a magnetic pole position information acquisition module 131.

The current command generation module 111 generates a current command (current target value) in accordance with a torque target value. For example, when the power conversion device 1 performs the speed control of the electric motor 9, the torque target value is determined in accordance with a deviation between the speed target value and the speed present value. When the power conversion device 1 performs the torque control of the electric motor 9, the control target value becomes the above-mentioned torque target value. For example, the current command generation module 111 generates a current command in a two-dimensional coordinate system fixed to a rotor of the electric motor 9. More specifically, the current command generation module 111 generates current command values Id_ref and Iq_ref in a dq coordinate system. In the dq coordinate system, for example, in a case where the electric motor 9 is a synchronous electric motor, a magnetic pole direction is a d axis and a direction orthogonal thereto is a q axis.

The fundamental wave generation module 112 generates a fundamental wave command for generating one-phase AC power constituting the three-phase AC power for each of the inverters 2U, 2V, and 2W. For example, the fundamental wave generation module 112 generates the fundamental wave command for the inverter cells 10 for each of the inverters 2U, 2V, and 2W. In some examples, the fundamental wave generation module 112 equally divides the fundamental wave command for generating the U-phase AC power in accordance with the current command values Id_ref and Iq_ref by the number of inverter cells 10 belonging to the inverter 2U, and generates the fundamental wave command for the inverter cell 10 of the inverter 2U. Similarly, the fundamental wave generation module 112 may equally divide the fundamental wave command for generating the V-phase AC power in accordance with the current command values Id_ref and Iq_ref by the number of inverter cells 10 belonging to the inverter 2V, and generate the fundamental wave command for the inverter cell 10 of the inverter 2V. Additionally, the fundamental wave generation module 112 may equally divide the fundamental wave command for generating the W-phase AC power in accordance with the current command values Id_ref and Iq_ref by the number of inverter cells 10 belonging to the inverter 2W, and generate the fundamental wave command for the inverter cell 10 of the inverter 2W.

In some examples where the electric motor 9 is a synchronous motor, the fundamental wave generation module 112 generates a fundamental wave command Kbase per the following expressions for each of the inverters 2U, 2V, and 2W.

[Expression 1]

$$\begin{cases} \text{Kbase\_u} = K \cdot \sin(\omega_0 \cdot t) \\ \text{Kbase\_v} = K \cdot \sin\left(\omega_0 \cdot t - \frac{2}{3} \cdot \pi\right) \\ \text{Kbase\_w} = K \cdot \sin\left(\omega_0 \cdot t - \frac{4}{3} \cdot \pi\right) \end{cases} \quad (1)$$

$\omega_0$: angular frequency of fundamental wave command

[Expression 2]

$$K = \frac{A}{Vdc} \quad (2)$$

A: voltage command amplitude in accordance with current command values Id_ref and Iq_ref, current measurement values Id_fbk and Iq_fbk (described later), frequency command Vdc: detected value of DC voltage by voltage detector 31

Although Expressions (1) and (2) exemplify the case where the voltage amplitude of the fundamental wave is calculated as a ratio to the DC voltage value Vdc between the DC buses 14P and 14N, the fundamental wave generation module 112 may calculate the voltage amplitude of the fundamental wave command as the absolute value of the voltage.

The adjustment wave generation module 113 generates the adjustment wave command having triple the frequency of the fundamental wave command. The phase of the adjustment wave command is calculated for each of the inverters 2U, 2V, and 2W with reference to the phase of the fundamental wave command. 120°, which is the phase difference between the phases of the fundamental wave command, corresponds to 360° in the adjustment wave command. Therefore, since the phase difference between the phases of the adjustment wave command is 360°, the phase of the adjustment wave command becomes equal for the inverters 2U, 2V, and 2W. For example, the adjustment wave generation module 113 may be configured to equally generate an adjustment wave command Kadd per the following expression for all the inverter cells 10.

[Expression 3]

$$\text{Kadd} = K\_3 \cdot \sin(\varphi\_3) \quad (3)$$

K_3: amplitude of adjustment wave command (hereinafter referred to as "adjustment wave amplitude")

$\varphi$_3: phase of adjustment wave command (hereinafter referred to as "adjustment wave phase")

The adjustment wave amplitude K_3 is calculated by the amplitude calculation module 123 described later, and $\varphi$_3 is calculated by the phase calculation module 122 described later.

The command output module 114 outputs the phase voltage command, in which the adjustment wave command is superimposed on the fundamental wave command, for each of the inverter cells 10. Outputting the phase voltage command also includes outputting a modulation factor value indicating the magnitude of the phase voltage target value by the ratio to the DC voltage value Vdc between the DC buses 14P and 14N. For example, the command output module 114 outputs the modulation rate value, in which the adjustment wave command Kadd calculated by Expression (3) is added to the fundamental wave command Kbase calculated by Expression (1), to the cell controller 40 of each inverter cell 10 as the phase voltage command. The cell controller 40 generates the gate driving signal in accordance with the phase voltage command and outputs the gate driving signal to the gate driving circuit 15.

In some examples, the amplitude of the phase voltage command may be compared with the DC voltage value Vdc. In a case where the phase voltage command is indicated by the ratio to the DC voltage value Vdc, the DC voltage value Vdc to be compared with the amplitude of the phase voltage command is 1.0. For example, if the amplitude of the phase voltage command exceeds the DC voltage value Vdc, the amplitude of the phase voltage command exceeds 1. In addition, if the amplitude of the phase voltage command is less than the DC voltage value Vdc, the amplitude of the phase voltage command is less than 1.

The coordinate conversion module 115 acquires the U-phase current measurement value Iu_fbk, the V-phase current measurement value Iv_fbk, and the W-phase current measurement value Iw_fbk from the current detectors 5, respectively, and converts the current measurement values Iu_fbk, Iv_fbk, and Iw_fbk into current measurement values Id_fbk and Iq_fbk in the dq coordinate system.

The power factor angle calculation module 121 calculates the power factor angle of the three-phase AC power output from the inverters 2U, 2V, and 2W. The power factor angle $\varphi$ is calculated by subtracting the current phase angle formed by the current measurement values Id_fbk and Iq_fbk from the voltage phase angle formed by the voltage values Vd and Vq, which represent the output voltages of the inverters 2U, 2V, and 2W in the dq coordinate system. For example, the power factor angle calculation module 121 calculates the power factor angle $\varphi$ by the following expression.

[Expression 4]

$$\varphi = \tan^{-1}\left(\frac{Vq}{Vd}\right) - \tan^{-1}\left(\frac{\text{Iq\_fbk}}{\text{Id\_fbk}}\right) \quad (4)$$

The power factor angle calculation module 121 may use the voltage values Vd and Vq based on the actual measurement result of the output voltage to calculate the power factor angle, or may use the voltage command values Vd_ref and Vq_ref as the voltage values Vd and Vq.

The phase calculation module 122 calculates the phase of the adjustment wave command based on the power factor of the three-phase AC power so as to reduce the voltage ripple occurring in the DC buses 14P and 14N at double the frequency of the fundamental wave command (hereinafter referred to as "second harmonic ripple"). In some examples, the phase calculation module 122 may determine an initial phase of the adjustment wave command to be offset from (in other words, to be different from) an initial phase of the fundamental wave command. The initial phase of the adjustment wave command is a phase of the adjustment wave command at a time when the phase of the fundamental wave command is equal to zero. For example, the phase calculation module 122 calculates the phase φ_3 based on the following expression.

[Expression 5]

$$\begin{cases} \phi\_3 = 3 \cdot \omega_0 \cdot t - \theta_N \\ \theta_N = 2 \cdot \varphi \end{cases} \quad (5)$$

The initial phase $\theta_N$ may be different from double the power factor angle as long as it is calculated so as to reduce at least the second harmonic ripple. For example, in a case where a value corresponding to double the power factor angle is set as a reference value $\theta_{N\_ref}$, the absolute value of the difference between the reference value $\theta_{N\_ref}$ and the initial phase $\theta_N$ has only to be less than at least the absolute value of the reference value $\theta_{N\_ref}$. The absolute value of the difference between the reference value $\theta_{N\_ref}$ and the initial phase $\theta_N$ may be 10% or less, 5% or less, or 3% or less of the absolute value of the reference value $\theta_{N\_ref}$.

The amplitude calculation module 123 calculates the amplitude of the adjustment wave command based on the amplitude of the fundamental wave command so as to reduce the above-mentioned second harmonic ripple. For example, the amplitude calculation module 123 calculates the adjustment wave amplitude K_3 to have the same value as the fundamental wave amplitude K. The adjustment wave amplitude K_3 may be different from the fundamental wave amplitude K as long as it is calculated so as to reduce at least the second harmonic ripple. For example, the absolute value of the difference between the fundamental wave amplitude K and the adjustment wave amplitude K_3 has only to be less than at least the fundamental wave amplitude K. The absolute value of the difference between the fundamental wave amplitude K and the adjustment wave amplitude K_3 may be 50% or less, 30% or less, or 10% or less of the fundamental wave amplitude K.

Here, as the fundamental wave amplitude K of the fundamental wave command Kbase increases, the amplitude of the phase voltage command may exceed the DC voltage value Vdc by superimposing the adjustment wave command Kadd on the fundamental wave command Kbase. The inverter circuit may, in principle, be unable to generate the AC voltage having the amplitude exceeding the DC voltage value Vdc between the DC buses 14P and 14N. In that case, if the phase voltage command having the amplitude exceeding the DC voltage value Vdc (that is, the phase voltage command exceeding 1) is output to the inverter circuit, such that the desired three-phase AC power is not obtained, it may be difficult to control the electric motor 9 to a desired state.

Figure 3:
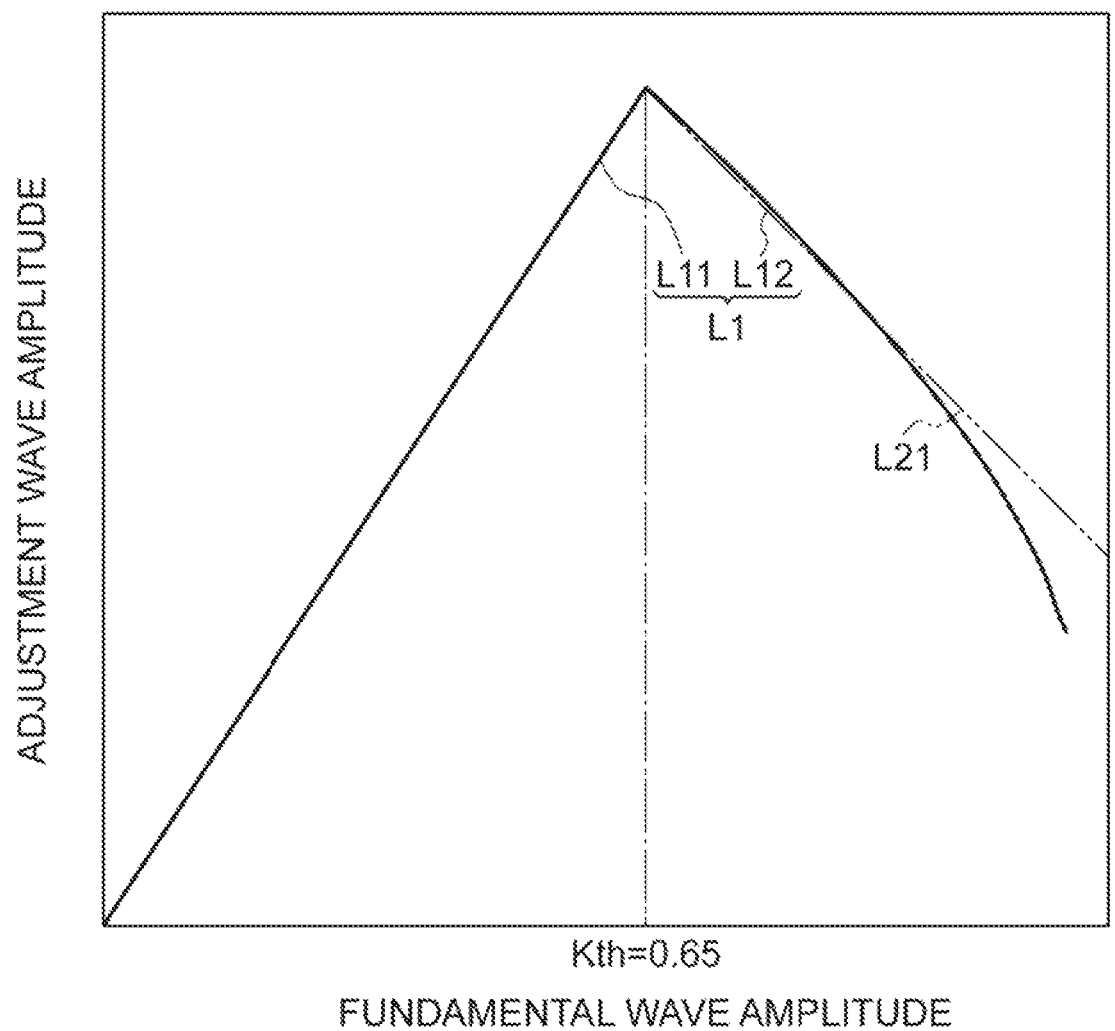
FIG. 3 is a graph showing a relationship between a fundamental wave amplitude and an adjustment wave amplitude.

FIG. 3 is a graph showing the calculation example of the adjustment wave amplitude K_3 in consideration of the above. In the graph, the horizontal axis represents the value of the fundamental wave amplitude K and the vertical axis represents the value of the adjustment wave amplitude K_3 calculated in accordance with the fundamental wave amplitude K. A line L1 shows the calculation example when the power factor is 1 (when the power factor angle is zero). In the ascending line L11 of the line L1, the adjustment wave amplitude K_3 is calculated to be the same value as the fundamental wave amplitude K. A modulation rate threshold value Kth represents the value of the fundamental wave amplitude K at which the phase voltage command becomes 1 when the adjustment wave amplitude K_3 is calculated in accordance with the ascending line L11. In a situation in which the fundamental wave amplitude K exceeds the modulation rate threshold value Kth, if the adjustment wave amplitude K_3 is set to the same value as the fundamental wave amplitude K, the phase voltage command will exceed 1. Therefore, in a descending line L12 of the line L1, the value of the adjustment wave amplitude K3 is adjusted such that the phase voltage command becomes 1.

In this manner, in order to switch the calculation method of the adjustment wave amplitude K_3 in accordance with the value of the fundamental wave amplitude K, the amplitude calculation module 123 may include a first amplitude calculation module 125, a second amplitude calculation module 126, and an amplitude selection module 127 as illustrated in FIG. 2. The first amplitude calculation module 125 may be configured to modify the amplitude of the adjustment wave command by increasing the amplitude of the adjustment wave command in a first amplitude modification operation in response to an increase in the amplitude of the fundamental wave command in a first range. Additionally, the second amplitude calculation module 126 may be configured to reduce the amplitude of the adjustment wave command in a second amplitude modification operation in response to an increase in the amplitude of the fundamental wave command in a second range. In some examples, the controller switches between the first amplitude modification operation and the second amplitude modification operation in response to the amplitude of the fundamental wave command exceeding a predetermined threshold.

The first amplitude calculation module 125 calculates the adjustment wave amplitude K_3 based on the fundamental wave amplitude K so as to reduce the second harmonic ripple. For example, the first amplitude calculation module 125 sets the value of the adjustment wave amplitude K_3 to the same value as the fundamental wave amplitude K by the following expression.

[Expression 6]

$$K\_3 = K \quad (6)$$

The second amplitude calculation module 126 lowers the amplitude of the adjustment wave amplitude K_3 as the fundamental wave amplitude K rises. For example, the second amplitude calculation module 126 calculates the adjustment wave amplitude K_3 by the following expression in accordance with the straight approximate descending line L21 (see FIG. 3) approximating the descending line L12.

[Expression 7]

$$K\_3 = a \cdot K + b \quad (7)$$

a: slope (negative value) of approximate descending line L21 b: intercept of approximate descending line L21

As the fundamental wave amplitude K rises, the amplitude selection module 127 switches the amplitude of the adjustment wave amplitude K_3 from the amplitude calculated by the first amplitude calculation module 125 (hereinafter referred to as "the first amplitude") to the amplitude calculated by the second amplitude calculation module 126 (hereinafter referred to as "the second amplitude"). For example, as the fundamental wave amplitude K exceeds a predetermined reference value (hereinafter referred to as "the first reference value"), the amplitude selection module 127 switches the amplitude of the adjustment wave amplitude K_3 from the first amplitude to the second amplitude. The first reference value may be, for example, the modulation rate threshold value Kth or a value less than the modulation rate threshold value Kth.

The value of the modulation rate threshold value Kth changes in accordance with the power factor of the three-phase AC power. Specifically, the modulation rate threshold value Kth also decreases as the power factor decreases (as the power factor angle increases). Therefore, the amplitude selection module 127 may change the first reference value in accordance with the power factor. More specifically, the amplitude selection module 127 may decrease the first reference value as the power factor decreases.

The second harmonic ripple is reduced by superimposing the adjustment wave command, which is generated based on the phase calculated by the phase calculation module 122 and the amplitude calculated by the amplitude calculation module 123, on the fundamental wave command. This principle will be described below. For simplicity, only the mathematical expression in the U phase is shown below.

The output voltage Vbase, the output current Ibase, and the output power Wbase, in accordance with the fundamental wave command, are represented by the following expressions.

[Expression 8]
$$Vbase = A \cdot \sin(\omega_0 \cdot t) \quad (8)$$

[Expression 9]
$$Ibase = B \cdot \sin(\omega_0 \cdot t - \varphi) \quad (9)$$

[Expression 10]
$$Wbase = Vbase \cdot Ibase \quad (10)$$
$$= -\frac{A \cdot B}{2} \cdot (\cos(2 \cdot \omega_0 \cdot t - \varphi) - \cos(\varphi))$$

As shown in Expression (10), the frequency of the vibration component of the output power Wbase is double the frequency of the fundamental wave command Kbase. Therefore, when only the fundamental wave command is output as the phase voltage command, the second harmonic ripple occurs in the DC voltage value Vdc in accordance with the frequency of the output power Wbase. Hereinafter, the vibration component, of which the frequency is double the frequency of the fundamental wave command Kbase, is referred to as "the second harmonic component".

The output voltage Vadd and the output power Wadd, in accordance with the adjustment wave command, are represented by the following expressions.

[Expression 11]
$$Vadd = K\_3 \cdot Vdc \cdot \sin(3 \cdot \omega_0 \cdot t + \theta_N) \quad (11)$$

[Expression 12]
$$Wadd = Vadd \cdot Ibase \quad (12)$$
$$= -\frac{K\_3 \cdot Vdc \cdot B}{2} \cdot$$
$$(\cos(4 \cdot \omega_0 \cdot t + \theta_N - \varphi) - \cos(2 \cdot \omega_0 \cdot t + \theta_N + \varphi))$$

Furthermore, the output power in which the adjustment wave command Kadd is superimposed on the fundamental wave command Kbase, in accordance with the phase voltage command, is represented by the following expression.

[Expression 13]
$$Wbase + Wadd = -\frac{A \cdot B}{2} \cdot (\cos(2 \cdot \omega_0 \cdot t - \varphi) - \cos(\varphi)) - \frac{K\_3 \cdot Vdc \cdot B}{2} \cdot (\cos(4 \cdot \omega_0 \cdot t - \varphi + \theta_N) - \cos(2 \cdot \omega_0 \cdot t + \varphi + \theta_N)) \quad (13)$$

Assuming that the phase calculation module 122 calculates the initial phase $\theta_N$ by Expression (5) and the amplitude calculation module 123 calculates the adjustment wave amplitude K_3 by Expression (6), the following expression is obtained by substituting Expressions (5) and (6) into Expression (13).

[Expression 14]
$$Wbase + Wadd = \frac{A \cdot B}{2} \cdot (-\cos(4 \cdot \omega_0 \cdot t - 3 \cdot \varphi) + \cos(\varphi)) \quad (14)$$

The output power represented by Expression (14) does not include the second harmonic component. In this manner, the second harmonic component disappears by calculating the initial phase $\theta_N$ by Expression (5) and calculating the adjustment wave amplitude K_3 by Expression (6). Hence, the second harmonic ripple of the DC voltage value Vdc also disappears.

The frequency of the vibration component at the output power represented by Expression (14) is four times the frequency of the fundamental wave command Kbase. Hereinafter, the vibration component, of which the frequency is four times the frequency of the fundamental wave command Kbase, is referred to as "the fourth harmonic component". As long as the vibration component remains in the output power, the ripple of the DC voltage value Vdc also remains, but the amplitude of the ripple is reduced as the vibration component becomes the fourth harmonic component of the high frequency.

In one or more of the above examples, the second harmonic component disappears by calculating the initial phase $\theta_N$ by Expression (5) and calculating the adjustment wave amplitude K_3 by Expression (6) has been exemplified. However, in other examples, the second harmonic components may not be cancelled. If the second harmonic component of the output power is at least reduced by superimposing the adjustment wave command Kadd on the fundamental wave command Kbase, the second harmonic ripple is suppressed.

The magnetic pole position information acquisition module 131 acquires information indicating the magnetic pole position of the electric motor 9. The magnetic pole position acquired by the magnetic pole position information acquisition module 131 corresponds to $\omega_0 \cdot t$ in Expression (1). The magnetic pole position information acquired by the magnetic pole position information acquisition module 131 is used for the generation of the fundamental wave command by the fundamental wave generation module 112, the coordinate conversion in the coordinate conversion module 115, the calculation of the adjustment wave phase in the phase calculation module 122, and the like.

(Overmodulation Correction Module)

As described above with reference to the amplitude calculation module 123, if the phase voltage command having the amplitude exceeding the DC voltage value Vdc is output to the inverter circuit such that the desired three-phase AC power is not obtained, it may be difficult to control the electric motor 9 to a desired state. Therefore, the controller 100 may further be configured to include an overmodulation correction module 124. The overmodulation correction module 124 subtracts the excess amount of amplitude, the amount by which the amplitude of one of the phase voltage commands exceeds the DC voltage value Vdc, from the amplitude of all the phase voltage commands. For example, if the amplitude of the phase voltage command for the inverter 2U exceeds the DC voltage value Vdc, the overmodulation correction module 124 calculates the amount by which the amplitude of the phase voltage command exceeds the DC voltage value Vdc (hereinafter referred to as "the excess amount"), and subtracts the excess amount from the amplitudes of the phase voltage command for all the inverters 2U, 2V, and 2W.

(Boost Circuit and Boost Control Module)

In order to further increase the voltage amplitude that can be output by the inverter cell 10, the controller 100 may further include a boost control module 128, and the inverter cell 10 may further include a boost circuit 20. As the fundamental wave amplitude K rises, the boost control module 128 generates a boost command for raising the DC voltage value Vdc. For example, the boost control module 128 generates the boost command in response to the fundamental wave amplitude K exceeding a predetermined reference value (hereinafter referred to as "the second reference value"). The second reference value may be, for example, the modulation rate threshold value Kth or a value less than the modulation rate threshold value Kth. The second reference value may be less than the first reference value.

As described above, in some examples the value of the modulation rate threshold value Kth may change in accordance with the power factor of the three-phase AC power. Therefore, the boost control module 128 may change the second reference value in accordance with the power factor. For example, the boost control module 128 may decrease the second reference value as the power factor decreases. Additionally, the boost control module 128 may generate the boost command such that the DC voltage value Vdc is equal to or greater than the amplitude of the phase voltage command. For example, if the fundamental wave amplitude K exceeds the second reference value, the boost control module 128 generates the boost command so as to boost the DC voltage value Vdc with a boost rate equal to or greater than the magnification obtained by dividing the fundamental wave amplitude K by the second reference value.

The boost circuit 20 may comprise a circuit for raising the DC voltage value Vdc in response to the boost command. For example, the boost circuit 20 may include a chopper circuit, such as a chopper circuit 21 and a chopper driving circuit 22. The chopper circuit 21 includes a coil 23, a switch 24, and a diode 25. The coil 23 is provided in the DC bus 14P between the rectifier circuit 11 and the capacitor 13. The switch 24 is connected to the DC buses 14P and 14N between the coil 23 and the capacitor 13. The switch 24 switches between a state of storing energy in the coil 23 and a state of releasing stored energy to the capacitor 13 side by on/off switching. The diode 25 is provided in the DC bus 14P between the switch 24 and the capacitor 13 and prevents current from the capacitor 13 to the switch 24.

The chopper driving circuit 22 controls the chopper circuit 21 so as to raise the DC voltage value Vdc. For example, the chopper driving circuit 22 controls the chopper circuit 21 so as to periodically switch on/off of the switch 24, and adjusts the boost rate in accordance with the ratio of the on time and the off time of the switch 24. For example, the chopper driving circuit 22 calculates the on time and the off time in accordance with the boost rate per the following expression.

[Expression 15]

$$Toff = \frac{T}{\alpha} \quad (15)$$

T: switching cycle
Toff: off time
α: boost rate command value

[Expression 16]

$$Ton = T\left(1 - \frac{1}{\alpha}\right) \quad (16)$$

Ton: on time

For examples comprising the boost circuit 20, the inverter cell 10 may include two voltage detectors 31A and 31B as the voltage detectors 31. The voltage detector 31A detects the DC voltage value Vdc between the DC buses 14P and 14N. The voltage detector 31B detects the DC voltage value Vdc between the DC bus 14N and the connection point of the chopper circuit 21 and the capacitor 13. In one or more of the following examples, the DC voltage value Vdc detected by the voltage detector 31A is referred to as the DC voltage value Vdc1, and the DC voltage value Vdc detected by the voltage detector 31B is referred to as the DC voltage value Vdc2, so as to distinguish the DC voltage values Vdc.

(Power Source)

In order to further increase the voltage amplitude that can be output by the inverter cell 10, the power conversion device 1 may further include a power source 3 (see FIG. 1). For example, the power source 3 generates an input AC voltage for inputting to the inverter cell 10 with the voltage amplitude greater than the fundamental wave amplitude K. For example, the power source 3 has a transformer 41. The transformer 41 is interposed between a power system PS and all the inverter cells 10 and generates the input AC voltage for each of the inverter cells 10. For example, the transformer 41 generates an input AC voltage which is greater than the maximum value of the fundamental wave amplitude K which can be set in the inverter cell 10.

(Hardware Configuration of Controller)

Figure 4:
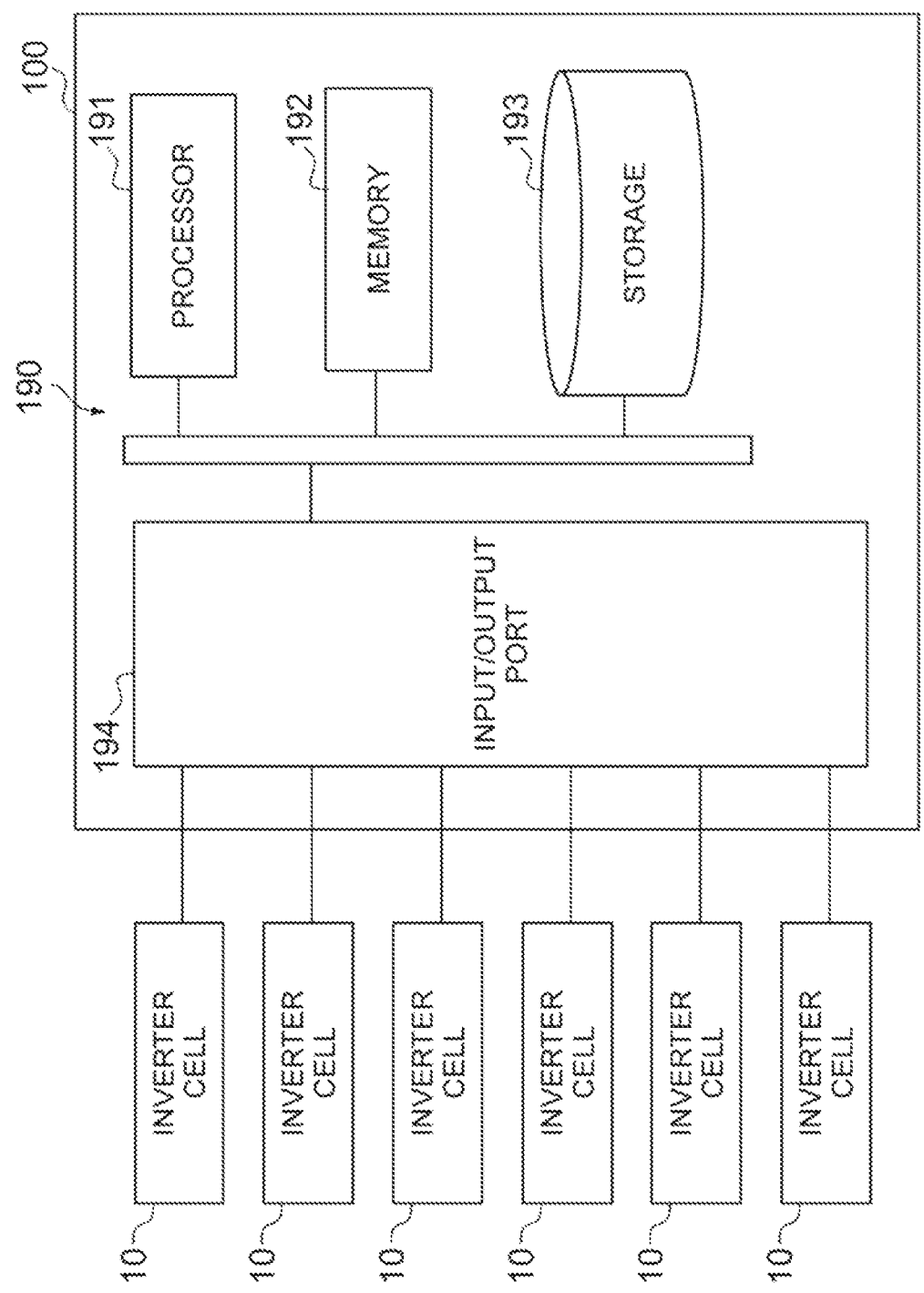
FIG. 4 is a block diagram illustrating a hardware configuration of a controller.

An example hardware configuration of the controller 100 will now be described. As illustrated in FIG. 4, the controller 100 includes a circuit 190. The circuit 190 includes one or more processors 191, a memory 192, a storage 193, and an input/output port 194. The storage 193 records a program for configuring each function module of the controller 100. The storage 193 may comprise a computer-readable device such as a non-volatile semiconductor memory mounted on a substrate or the like, but may be a hard disk, a magnetic disk, an optical disk, or the like externally equipped. The memory 192 temporarily stores the program loaded from the storage 193, the calculation result of the processor 191, and the like. The processor 191 may be configured to execute the program in cooperation with the memory 192, in order to configure and/or control one or more of the functional modules. The input/output port 194 inputs and outputs a signal to and from each inverter cell 10 in response to a command from the processor 191.

The circuit 190 may comprise hardware, software, firmware, or any combination thereof. The circuit 190 may perform one or more of the functions through execution of a program. In some examples, the circuit 190 may perform at least a part of the functions by the use of one or more integrated circuits, such as dedicated logic circuits or an application specific integrated circuit (ASIC), or the like.

(Power Conversion Procedure)

Subsequently, as an example of the power conversion method, a power conversion procedure performed by the power conversion device 1 will be described. The power conversion procedure may include generating a fundamental wave command for generating one-phase AC power of three-phase AC power for each of the inverters 2U, 2V, and 2W so as to cause the inverters 2U, 2V, and 2W to generate three-phase AC power, and generating an adjustment wave command having triple the frequency of the fundamental wave command for each of the inverters 2U, 2V and 2W. Additionally, the power conversion procedure may comprise outputting a phase voltage command, in which the adjustment wave command is superimposed on the fundamental wave command, for each of the inverters 2U, 2V, and 2W. The phase of the adjustment wave command may then be calculated based on the power factor of the three-phase AC power so as to reduce the voltage ripple occurring in the DC buses 14P and 14N at double the frequency of the fundamental wave command.

Figure 5:
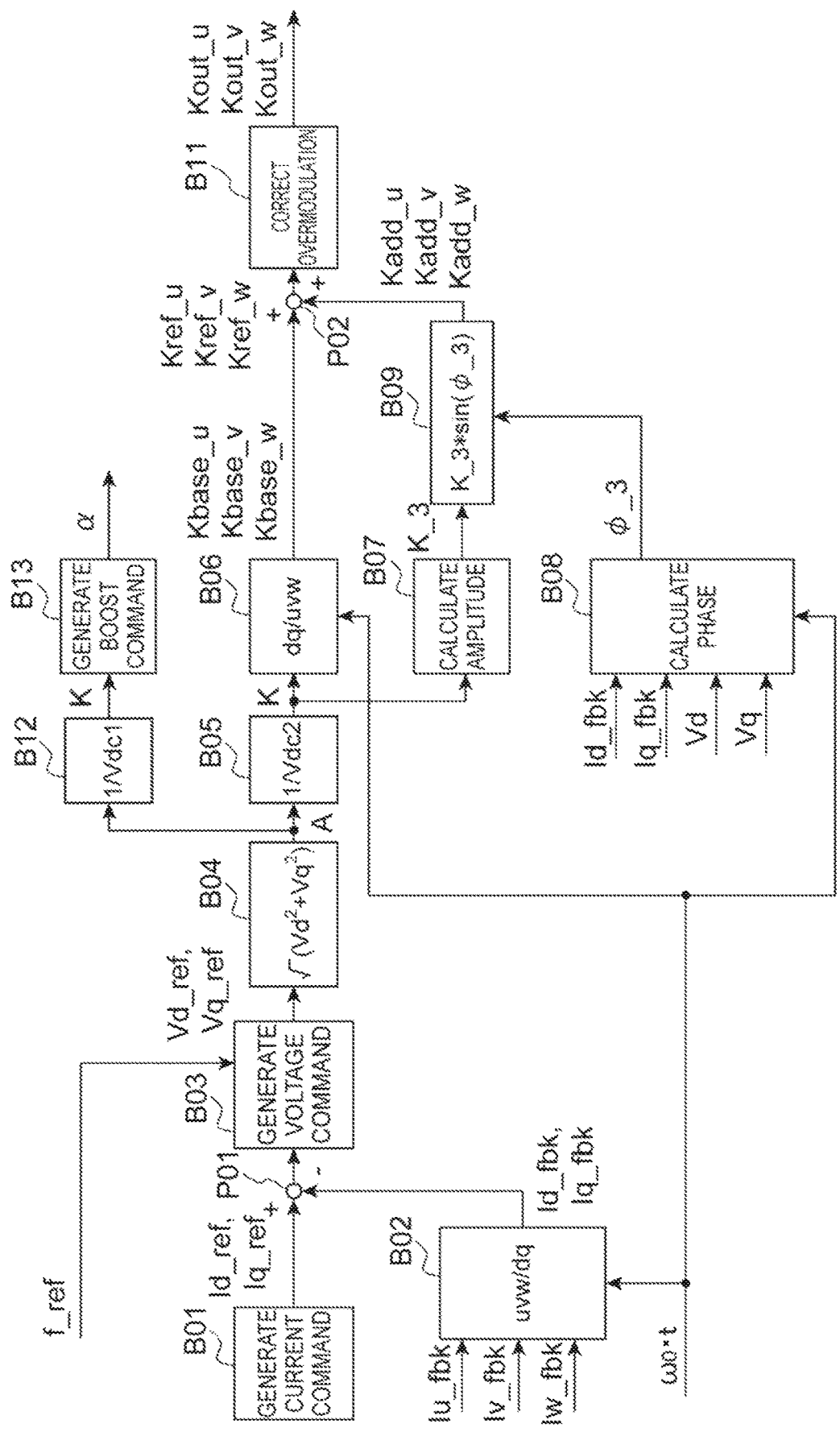
FIG. 5 is a block diagram illustrating a power conversion procedure.

FIG. 5 is a block diagram illustrating an example power conversion procedure. The power conversion device 1 repeats the power conversion procedure illustrated in FIG. 5 at a preset control cycle. In FIG. 5, at block B01, the current command generation module 111 generates the current command values Id_ref and Iq_ref. At block B02, the coordinate conversion module 115 converts the current measurement values Iu_fbk, Iv_fbk, and Iw_fbk into the current measurement values Id_fbk and Iq_fbk. At the addition point P01, the fundamental wave generation module 112 calculates the current deviation by subtracting the current measurement values Id_fbk and Iq_fbk from the current command values Id_ref and Iq_ref.

At block B03, the fundamental wave generation module 112 performs a proportional calculation, a proportional/integral calculation, a proportional/integral/differential calculation, or the like, on the current deviation, and calculates the voltage command values Vd_ref and Vq_ref by adding the counter electromotive force proportional to the frequency command to the calculation result. For example, the fundamental wave generation module 112 calculates the counter electromotive force by using the frequency command f_ref. At block B04, the fundamental wave generation module 112 calculates the voltage command amplitude A based on the voltage command values Vd_ref and Vq_ref. For example, the fundamental wave generation module 112 calculates the square root of the square sum of the voltage command values Vd_ref and Vq_ref as the voltage command amplitude A.

At block B05, the fundamental wave generation module 112 calculates the fundamental wave amplitude K by dividing the voltage command amplitude A by the DC voltage value Vdc2. As described above, the DC voltage value Vdc2 is a value measured at the connection point of the chopper circuit 21 and the capacitor 13. Therefore, when the DC voltage value Vdc2 is increased by the chopper circuit 21, the rise of the fundamental wave amplitude K is prevented.

At block B06, the fundamental wave generation module 112 calculates fundamental wave commands Kbase_u, Kbase_v, and Kbase_w of the U phase, the V phase, and the W phase by coordinate conversion. At block B07, the amplitude calculation module 123 calculates the adjustment wave amplitude K_3 based on the fundamental wave amplitude K. Specific processing contents at block B07 will be described later.

At block B08, the power factor angle calculation module 121 and the phase calculation module 122 calculate the adjustment wave phase φ_3 ($3\cdot\omega_0\cdot t+\theta_N$ in Expression (3)) based on the current measurement values Id_fbk and Iq_fbk and the voltage values Vd and Vq. Additional processing contents at block B08 will be described later.

At block B09, the adjustment wave generation module 113 generates the adjustment wave commands Kadd_u, Kadd_v, and Kadd_w for the U phase, the V phase, and the W phase, respectively, based on the adjustment wave amplitude K_3 calculated at block B07 and the adjustment wave phase φ_3 calculated at block B08. At the addition point P02, the command output module 114 adds the adjustment wave commands Kadd_u, Kadd_v, and Kadd_w to the fundamental wave commands Kbase_u, Kbase_v, and Kbase_w, respectively, and outputs the phase voltage command values Kref_u, Kref_v, and Kref_w for the inverters 2U, 2V, and 2W.

At block B11, the overmodulation correction module 124 subtracts the amount, by which one of the phase voltage command values Kref_u, Kref_v, and Kref_w exceeds the DC voltage value Vdc2, from all the phase voltage command values Kref_u, Kref_v, and Kref_w, and outputs the corrected command values Kout_u, Kout_v, and Kout_w to the cell controllers 40 of the inverter cells 10 of the inverters 2U, 2V, and 2W, respectively. The cell controllers 40 generate the gate driving signals in accordance with the corrected command values Kout_u, Kout_v, Kout_w, and output the generated gate driving signals to the gate driving circuits 15. Therefore, the switching circuit 16 is controlled so as to generate the output voltage in accordance with the corrected command values Kout_u, Kout_v, and Kout_w. Additional processing contents at block B11 will be described later.

At block B12, the boost control module 128 calculates the fundamental wave amplitude K by dividing the voltage command amplitude A generated at block B04 by the DC voltage value Vdc1. At block B13, the boost control module 128 generates the boost rate command value α based on the fundamental wave amplitude K. Additional processing contents at block B13 will be described later. As described above, the DC voltage value Vdc1 is a value measured at the connection point of the rectifier circuit 11 and the chopper circuit 21. Therefore, at block B13, the boost rate command value α is generated based on the DC voltage value Vdc before boosting by the chopper circuit 21.

Additional example contents of the amplitude calculation procedure at block B07, the phase calculation procedure at block B08, the overmodulation correction procedure at block B11, and the boost command generation procedure at block B13 are described below.

(Amplitude Calculation Procedure)

Figure 6:
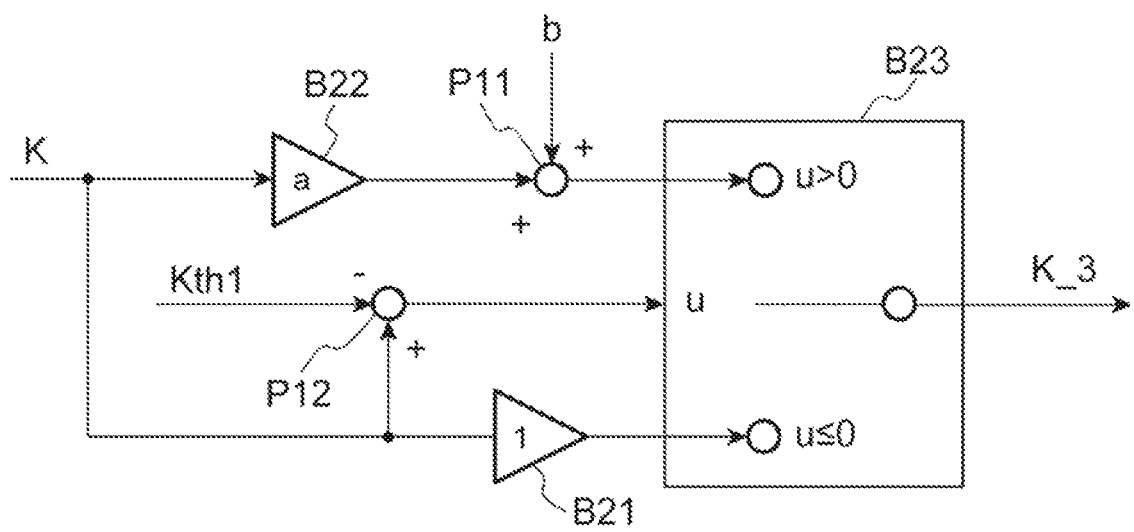
FIG. 6 is a block diagram illustrating a procedure of calculating an amplitude of an adjustment wave.

FIG. 6 is a block diagram illustrating an example amplitude calculation procedure. In FIG. 6, at block B21, the first amplitude calculation module 125 calculates the first amplitude having the same value as the fundamental wave amplitude K. At block B22, the second amplitude calculation module 126 multiplies the fundamental wave amplitude K by the slope "a" of the approximate descending line L21. At the addition point P11, the second amplitude calculation module 126 calculates the second amplitude by adding the intercept "b" of the approximate descending line L21 to the value generated at block B22. At the addition point P12, the amplitude selection module 127 calculates the determination reference value "u" by subtracting the first reference value Kth1 from the fundamental wave amplitude K.

At block B23, the amplitude selection module 127 selects one of the first amplitude and the second amplitude as the adjustment wave amplitude K_3 in accordance with the value of the determination reference value "u". For example, if the determination reference value "u" is equal to or less than zero, the amplitude selection module 127 selects the first amplitude as the adjustment wave amplitude K_3. If the determination reference value "u" exceeds zero, the second amplitude is selected as the adjustment wave amplitude K_3. The amplitude calculation procedure is completed.

(Phase Calculation Procedure)

Figure 7:
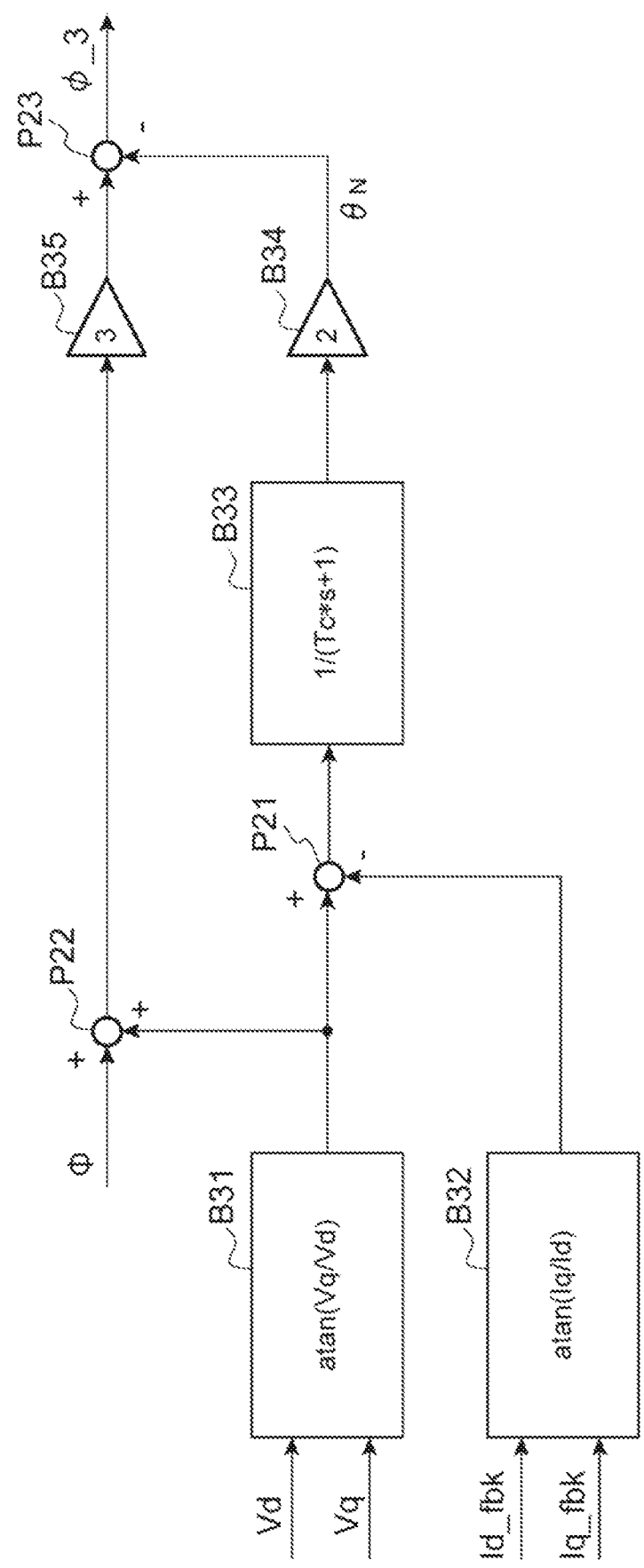
FIG. 7 is a block diagram illustrating a procedure of calculating a phase of an adjustment wave.

FIG. 7 is a block diagram illustrating an example phase calculation procedure. In FIG. 7, at block B31, the power factor angle calculation module 121 calculates the phase angle of the voltage values Vd and Vq. At block B32, the power factor angle calculation module 121 calculates the phase angle of the current measurement values Id_fbk and Iq_fbk. At the addition point P21, the power factor angle calculation module 121 calculates the power factor angle by subtracting the phase angle of the current measurement values Id_fbk and Iq_fbk from the phase angle of the voltage values Vd and Vq.

At block B33, the phase calculation module 122 performs the filtering processing of first order delay on the power factor angle calculated at the addition point P21. A time constant Tc at block B33 is set to, for example, a value greater than a carrier cycle of the gate driving circuit 15. At block B34, the phase calculation module 122 calculates the initial phase $\theta_N$ by multiplying the power factor angle by 2. At the addition point P22, the phase calculation module 122 converts the phase angle of the voltage values Vd and Vq in the dq coordinate system into the phase angle in the fixed coordinate system (for example, the $\alpha\beta$ coordinate system).

At block B35, the phase calculation module 122 calculates the phase angle corresponding to triple the phase angle of the fundamental wave command Kbase (hereinafter referred to as "the triple phase angle") by multiplying the phase angle obtained at the addition point P22 by 3. At the addition point P23, the phase calculation module 122 calculates the adjustment wave phase $\varphi\_3$ by subtracting the initial phase $\theta_N$ obtained at block B34 from the triple phase angle obtained at block B35. The phase calculation procedure is then completed.

(Overmodulation Correction Procedure)

Figure 8:
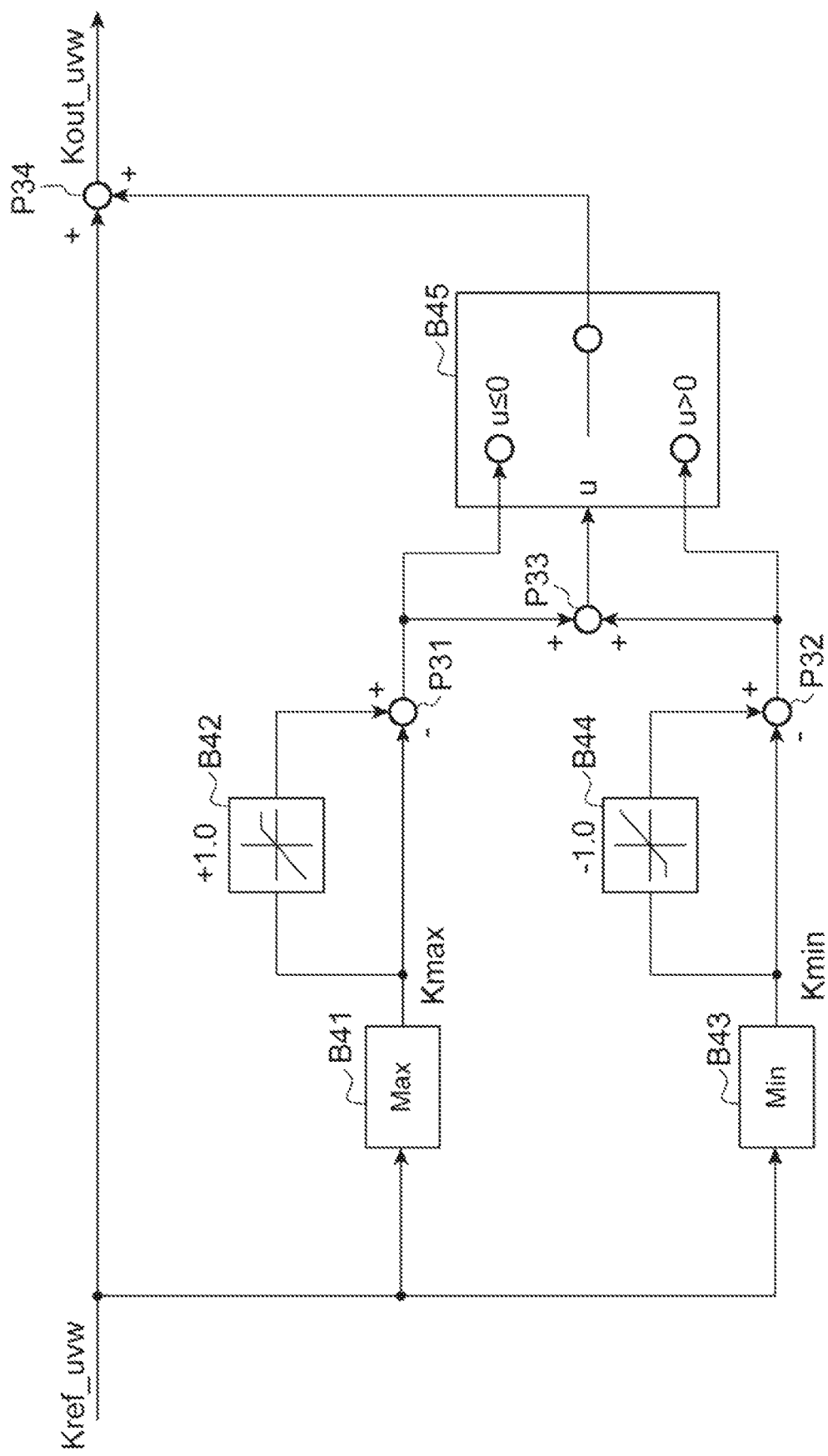
FIG. 8 is a block diagram illustrating an overmodulation correction procedure.

FIG. 8 is a block diagram illustrating an example overmodulation correction procedure. In FIG. 8, at block B41, the overmodulation correction module 124 selects the maximum value Kmax of the phase voltage command values Kref_u, Kref_v, and Kref_w. More specifically, the overmodulation correction module 124 selects the maximum value of the phase voltage command value of the U phase, the phase voltage command value of the V phase, and the phase voltage command value of the W phase. At block B42, the overmodulation correction module 124 performs the limiter processing to set the upper limit value to 1 with respect to the maximum value Kmax.

At the addition point P31, the overmodulation correction module 124 subtracts the maximum value Kmax from the result of the limiter processing at block B42. If the maximum value Kmax is 1 or less, the result of the limiter processing at block B42 has the same value as the maximum value Kmax. If the maximum value Kmax exceeds 1, the result of the limiter processing at block B42 becomes 1, which is less than the maximum value Kmax. Therefore, if the maximum value Kmax is 1 or less, the calculation result at the addition point P31 becomes zero, and if the maximum value Kmax exceeds 1, the calculation result at the addition point P31 becomes a negative value. Hereinafter, the calculation result at the addition point P31 is referred to as "the first correction value".

At block B43, the overmodulation correction module 124 selects the minimum value Kmin of the phase voltage command values Kref_u, Kref_v, and Kref_w. In some examples, the overmodulation correction module 124 selects the minimum value of the phase voltage command value of the U phase, the phase voltage command value of the V phase, and the phase voltage command value of the W phase. At block B44, the overmodulation correction module 124 performs the limiter processing to set the lower limit value to −1 with respect to the minimum value Kmin.

At the addition point P32, the overmodulation correction module 124 subtracts the minimum value Kmin from the result of the limiter processing at block B44. If the minimum value Kmin is −1 or more, the result of the limiter processing at block B44 has the same value as the minimum value Kmin. If the minimum value Kmin is less than −1, the result of the limiter processing at block B44 becomes −1, which is greater than the minimum value Kmin. Therefore, if the minimum value Kmin is equal to or greater than −1, the calculation result at the addition point P32 becomes zero, and if the minimum value Kmin is less than −1, the calculation result at the addition point P32 becomes a positive value. Hereinafter, the calculation result at the addition point P32 is referred to as "the second correction value".

At the addition point P33, the overmodulation correction module 124 calculates the determination reference value "u" by adding the calculation results at the addition points P31 and P32. At block B45, the overmodulation correction module 124 selects one of the first correction value and the second correction value in accordance with the determination reference value "u". For example, the overmodulation correction module 124 selects the first correction value when the determination reference value "u" is equal to or less than zero, and selects the second correction value when the determination reference value "u" exceeds zero.

At the addition point P34, the overmodulation correction module 124 adds the correction value selected at block B45 to the phase voltage command values Kref_u, Kref_v, and Kref_w. For example, if the maximum value Kmax exceeds 1 and the minimum value Kmin is −1 or more, the first correction value becomes a negative value and the second correction value becomes zero. Therefore, the determination reference value "u" becomes a negative value, the first correction value is selected, and the first correction value which is a negative value is added to all the phase voltage command values Kref_u, Kref_v, and Kref_w. Therefore, the amount by which the maximum value Kmax exceeds 1 is subtracted from the phase voltage command values Kref_u, Kref_v, and Kref_w. Therefore, Kmax can be set to 1 or less. On the other hand, if the maximum value Kmax is 1 or less and the minimum value Kmin is less than −1, the first correction value becomes zero and the second correction value becomes a positive value. Therefore, the determination reference value "u" becomes a positive value, the second correction value is selected, and the second correction value which is a positive value is added to all the phase voltage command values Kref_u, Kref_v, and Kref_w. Therefore, the amount (lower amount) by which the minimum value Kmin exceeds −1 is subtracted from the phase voltage command values Kref_u, Kref_v, and Kref_w. Therefore, Kmin can be set to −1 or more.

(Boost Command Generation Procedure)

Figure 9:
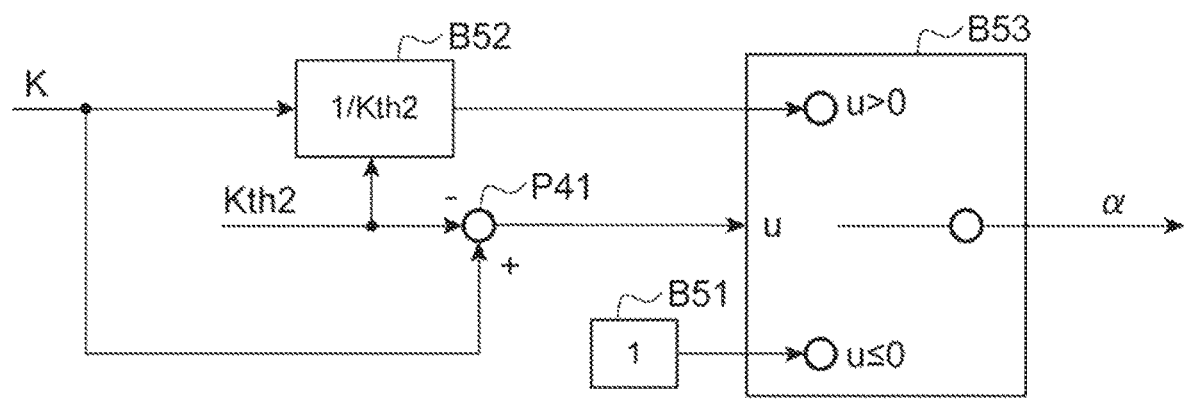
FIG. 9 is a block diagram illustrating a procedure of generating a boost command.

FIG. 9 is a block diagram illustrating an example boost command generation procedure. In FIG. 9, at block B51, the boost control module 128 sets the boost rate command value to 1. Hereinafter, the calculation result in block B51 is referred to as "the first command value". At block B52, the boost control module 128 generates the boost rate command value by dividing the fundamental wave amplitude K by the second reference value Kth2. Hereinafter, the generation result at block B52 is referred to as "the second command value". At the addition point P41, the boost control module 128 calculates the determination reference value "u" by subtracting the second reference value Kth2 from the fundamental wave amplitude K.

At block B53, the boost control module 128 selects either one of the first command value or the second command value as the boost rate command value α in accordance with the determination reference value u. For example, if the determination reference value u is equal to or less than zero, the boost control module 128 selects the first command value as the boost rate command value α. When the determination reference value u exceeds zero, the second command value is selected as the boost rate command value α. Therefore, if the fundamental wave amplitude K exceeds the second reference value Kth2, the boost rate command value α is calculated so as to boost the DC voltage value Vdc with the magnification obtained by dividing the fundamental wave amplitude K by the second reference value Kth2. The boost command generation procedure is then completed.

In one or more examples, and as described above, the power conversion device 1 may include the three inverters 2U, 2V, and 2W which convert the DC power of the DC buses 14P and 14N into the single-phase AC power, and the controller 100 which controls the three inverters 2U, 2V, and 2W so as to generate the three-phase AC power. The controller 100 may include the fundamental wave generation module 112 which generates the fundamental wave command for each of the inverter 2U, 2V, and 2W, for generating the AC power of one phase of the three-phase AC power, and the adjustment wave generation module 113 which generates the adjustment wave commands with triple the frequency of the fundamental wave command for each of the inverters 2U, 2V, and 2W. Additionally, the controller 100 may include the command output module 114 which outputs the phase voltage command, in which the adjustment wave command is superimposed on the fundamental wave command, for each of the inverters 2U, 2V, and 2W, and the phase calculation module 122 which calculates the phase of the adjustment wave command based on the power factor of the three-phase AC power so as to reduce the voltage ripples occurring in the DC buses 14P and 14N at double the frequency of the fundamental wave command.

When the adjustment wave command having triple the frequency of the fundamental wave command is superimposed on the fundamental wave command, the single-phase AC voltage waveforms output from the respective inverters 2U, 2V, and 2W change. On the other hand, the waveform of the line voltage of the three-phase AC power is the same as in the example in which the adjustment wave command is not superimposed. In some examples, the adjustment wave component superimposed on one phase voltage by the adjustment wave command and the adjustment wave component superimposed on the other phase voltage by the adjustment wave command cancel each other. Therefore, by superimposing the adjustment wave command, the voltage waveform of each phase may be adjusted without substantially changing the three-phase AC power.

In some examples, the voltage ripple tends to occur at double the frequency of the fundamental wave command on the DC bus of the inverter. Hereinafter, this is referred to as "the second harmonic ripple". In order to suppress the second harmonic ripple, a large capacitor capacity may be maintained between the DC buses 14P and 14N. Therefore, in order to reduce the capacitor capacity, the second harmonic ripple may be reduced by measures other than the capacitor capacity. For example, the second harmonic ripple can be reduced by adjusting the phase of the adjustment wave command with respect to the fundamental wave command (hereinafter referred to as "the adjustment wave phase"). The adjustment wave phase which is effective for reducing the second harmonic ripple correlates with the power factor of the three-phase AC power. Using these properties, the phase calculation module 122 calculates the phase of the adjustment wave command with respect to the fundamental wave command based on the power factor of the three-phase AC power so as to reduce the second harmonic ripple. Therefore, since the second harmonic ripple is reduced, the capacitor capacity can be reduced. Therefore, the capacitor capacity of the inverters 2U, 2V and 2W may be reduced.

The controller 100 may further include the amplitude calculation module 123 which calculates the amplitude of the adjustment wave command based on the amplitude of the fundamental wave command so as to reduce the voltage ripple. The amplitude of the adjustment wave command (hereinafter referred to as "the adjustment wave amplitude") which is effective for reducing the second harmonic ripple correlates with the amplitude of the fundamental wave command. Therefore, according to the configuration of calculating the amplitude of the adjustment wave command based on the amplitude of the fundamental wave command so as to reduce the voltage ripple, the second harmonic ripple may be more reliably reduced.

The controller 100 may further include the overmodulation correction module 124 which subtracts the excess amount of amplitude, the amount by which the amplitude of one of the phase voltage commands exceeds the voltage of the DC buses 14P and 14N, from the amplitude of all the phase voltage commands. Adjusting the phase and the amplitude of the adjustment wave command, so as to reduce the second harmonic ripple, may cause the phase voltage command to exceed the voltage of the DC bus. Hereinafter, if the phase voltage command exceeds the voltage of the DC bus, it is referred to as "the overmodulation state". In the overmodulation state, the deviation between the actually output phase voltage and the phase voltage command increases, and the reliability of the three-phase AC power decreases. On the other hand, since the overmodulation correction module 124 is further included, the occurrence of the overmodulation state can be prevented and the reliability of the three-phase AC power can be improved.

In order to reduce the voltage ripple, the amplitude calculation module 123 may include the first amplitude calculation module 125 which calculates the amplitude of the adjustment wave command based on the amplitude of the fundamental wave command, and the second amplitude calculation module 126 which lowers the amplitude of the adjustment wave command in response to the increase in the amplitude of the fundamental wave command. Additionally, the amplitude calculation module 123 may include the amplitude selection module 127 which switches the amplitude of the adjustment wave command from the amplitude calculated by the first amplitude calculation module 125 to the amplitude calculated by the second amplitude calculation module 126 in response to the increase in the amplitude of the fundamental wave command.

The occurrence of the overmodulation state can be prevented by switching the amplitude of the adjustment wave command from the amplitude calculated by the first amplitude calculation module 125 to the amplitude calculated by the second amplitude calculation module 126. In this manner, the method of preventing the occurrence of the overmodulation state by switching the amplitude is referred to as "the first overmodulation prevention". On the other hand, the method of preventing the occurrence of the overmodulation state by the overmodulation correction module 124 (the method of subtracting the amount by which the phase voltage command exceeds the voltage of the DC buses 14P and 14N, from the phase voltage command) is referred to as "the second overmodulation prevention".

According to the second overmodulation prevention, since the amount by which the phase voltage command exceeds the voltage of the DC bus (hereinafter referred to as "the overvoltage amount") is subtracted from the phase voltage command, the overmodulation can be prevented with high reliability. On the other hand, since the voltage exceeding amount is forcibly subtracted from the phase voltage command, the waveform of the adjustment wave command which provides the reduction effect of the second harmonic ripple is disturbed. This may lessen or impair the effect of reducing the second harmonic ripple. On the other hand, according to the first overmodulation prevention, since the waveform of the adjustment wave command is maintained, the effect of reducing the second harmonic ripple may not be lessened due to the disturbance of the waveform. Therefore, the overmodulation prevention can be achieved with high reliability while maintaining the effect of reducing the second harmonic ripple by combining the first and second overmodulation preventions.

The controller 100 further includes the boost control module 128 which generates the boost command for raising the voltage of the DC bus in response to the increase in the amplitude of the fundamental wave command, and each of the three inverters 2U, 2V, and 2W may include the boost circuit which raises the voltage between the DC buses 14P and 14N in response to the boost command. In this case, the allowable range of the amplitude of the fundamental wave command can be widened, and the second harmonic ripple can be more reliably reduced.

The amplitude selection module 127 switches the amplitude of the adjustment wave command from the amplitude calculated by the first amplitude calculation module 125 to the amplitude calculated by the second amplitude calculation module 126 in response to the amplitude of the fundamental wave command which exceeds the first reference value. Additionally, the boost control module 128 may generate the boost command in response to the amplitude of the fundamental wave command which exceeds the second reference value less than the first reference value. In this case, since the voltage between the DC buses 14P and 14N rises prior to the first overmodulation prevention, the second harmonic ripple may be more reliably reduced. In addition, when the voltage rise of the DC buses 14P and 14N is insufficient, the overmodulation prevention can be achieved with high reliability while preventing the reduction in the effect of reducing the second harmonic ripple by combining the first and second overmodulation preventions.

The boost control module 128 may generate the boost command such that the voltage between the DC buses 14P and 14N are equal to or greater than the amplitude of the phase voltage command. In this case, the second harmonic ripple may be more reliably reduced.

The power conversion device 1 may further include the power source 3 which generates the input AC voltage to be input to the inverters 2U, 2V, and 2W at the voltage amplitude greater than the amplitude of the fundamental wave command. In this case, the allowable range of the amplitude of the fundamental wave command can be widened, and the second harmonic ripple can be more reliably reduced.

Each of the three inverters 2U, 2V, and 2W may be a series connected multi-level inverter in which the AC sides of a plurality of inverter circuits 12 are connected in series.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

Regarding the above embodiments, the following appendices are appended.

[Appendix 1] A power conversion device comprising:
three inverters configured to convert DC power of a DC bus into single-phase AC power; and
a controller configured to control the three inverters so as to generate three-phase AC power,
wherein the controller comprises:
a fundamental wave generation module configured to generate a fundamental wave command for generating one-phase AC power constituting the three-phase AC power for each of the inverters;
an adjustment wave generation module configured to generate an adjustment wave command having triple the frequency of the fundamental wave command for each of the inverters;
a command output module configured to output a phase voltage command, in which the adjustment wave command is superimposed on the fundamental wave command, for each of the inverters; and
a phase calculation module configured to calculate a phase of the adjustment wave command based on a power factor of the three-phase AC power so as to reduce a voltage ripple occurring in the DC bus at double the frequency of the fundamental wave command.

[Appendix 2] The power conversion device according to appendix 1, wherein the controller further comprises an amplitude calculation module configured to calculate an amplitude of the adjustment wave command based on an amplitude of the fundamental wave command so as to reduce the voltage ripple.

[Appendix 3] The power conversion device according to appendix 2, wherein the controller further comprises an overmodulation correction module configured to subtract an amount, by which an amplitude of one of the phase voltage commands exceeds a voltage of the DC bus, from amplitudes of all the phase voltage commands.

[Appendix 4] The power conversion device according to appendix 2 or 3, wherein the amplitude calculation module comprises:

a first amplitude calculation module configured to calculate the amplitude of the adjustment wave command based on the amplitude of the fundamental wave command so as to reduce the voltage ripple;

a second amplitude calculation module configured to reduce the amplitude of the adjustment wave command in response to the increase in the amplitude of the fundamental wave command; and an amplitude selection module configured to switch the amplitude of the adjustment wave command from an amplitude calculated by the first amplitude calculation module to an amplitude calculated by the second amplitude calculation module in response to the increase in the amplitude of the fundamental wave command.

[Appendix 5] The power conversion device according to appendix 4, wherein the controller further comprises a boost control module configured to generate a boost command to raise the voltage of the DC bus in response to the increase in the amplitude of the fundamental wave command, and each of the three inverters comprises a boost circuit configured to raise the voltage of the DC bus in response to the boost command.

[Appendix 6] The power conversion device according to appendix 5, wherein the amplitude selection module is configured to switch the amplitude of the adjustment wave command from the amplitude calculated by the first amplitude calculation module to the amplitude calculated by the second amplitude calculation module as the amplitude of the fundamental wave command exceeds a first reference value, and the boost control module is configured to generate the boost command as the amplitude of the fundamental wave command exceeds a second reference value less than the first reference value.

[Appendix 7] The power conversion device according to appendix 2 or 3, wherein the controller further comprises a boost control module configured to generate a boost command to raise the voltage of the DC bus in response to the increase in the amplitude of the fundamental wave command, and each of the three inverters comprises a boost circuit configured to raise the voltage of the DC bus in response to the boost command.

[Appendix 8] The power conversion device according to any one of appendices 5 to 7, wherein the boost control module is configured to generate the boost command such that the voltage of the DC bus is equal to or greater than the amplitude of the phase voltage command.

[Appendix 9] The power conversion device according to any one of appendices 2 to 8, further comprising a power source configured to generate an input AC voltage to be input to the inverters at a voltage amplitude greater than the amplitude of the fundamental wave command.

[Appendix 10] The power conversion device according to any one of appendices 1 to 9, wherein each of the three inverters is a series connected multi-level inverter in which AC sides of a plurality of inverter circuits are connected in series.

[Appendix 11] A power conversion method comprising:
generating a fundamental wave command for generating one-phase AC power of three-phase AC power for each of three inverters, such that the three-phase AC power is generated in the three inverters configured to convert DC power of a DC bus into single-phase AC power;

generating, for each of the three inverters, an adjustment wave command having triple the frequency of the fundamental wave command;

outputting, for each of the three inverters, a phase voltage command, in which the adjustment wave command is superimposed on the fundamental wave command; and calculating a phase of the adjustment wave command with respect to the fundamental wave command based on a power factor of the three-phase AC power so as to reduce a voltage ripple occurring in the DC bus at double the frequency of the fundamental wave command.

FIG. 10 is a flow chart illustrating an example power conversion method for generating one-phase AC power of three-phase AC power for each of three inverters configured to convert DC power of a DC bus into single-phase AC power. The operations of the method may be performed for each of the three inverters. Additionally, the operations may be performed by a controller in response to execution of instructions stored on a non-transitory memory device.

At operation 210, a fundamental wave command is generated. The fundamental wave command has a fundamental frequency.

At operation 215, an initial phase of the adjustment wave command is determined to be offset from an initial phase of the fundamental wave command so as to reduce a voltage ripple occurring in the DC bus at double the fundamental frequency of the fundamental wave command.

At operation 220, an adjustment wave command is generated, having triple the fundamental frequency of the fundamental wave command.

At operation 225, a phase voltage command is output, in which the adjustment wave command is superimposed on the fundamental wave command.

FIG. 11 is a flow chart illustrating a flow chart illustrating another example power conversion method for generating AC power.

Operations 210 to 225 is the same as FIG. 10. At operation 235, a boost command is generated to raise the voltage of the DC bus in response to an increase in the amplitude of the fundamental wave.

At operation 240, the voltage of the DC bus is raised in response to the boost command.

At operation 245, the amplitude voltage value corresponding to the first reference value is raised in response to the boost command.

At operation 250, a modification operation of the amplitude of the adjustment wave is switched between the first amplitude modification operation and the second amplitude modification operation in response to the amplitude of the fundamental wave command exceeding a first reference value.

At operation 255, an amplitude of the adjustment wave command is increased in a first amplitude modification operation in response to an increase in the amplitude of the fundamental wave.

At operation 260, the amplitude of the adjustment wave command is reduced in a second amplitude modification operation in response to an increase in the amplitude of the fundamental wave.

What is claimed is:
1. A power conversion device comprising:
three inverters each of which is configured to convert DC power of a DC bus into single-phase AC power; and
a controller configured to control the three inverters so as to generate three-phase AC power,
wherein the controller is further configured to, for each of the three inverters:

generate a fundamental wave for generating one-phase AC power constituting the three-phase AC power, the fundamental wave having a fundamental frequency;

generate an adjustment wave having a frequency that is triple the fundamental frequency of the fundamental wave;

increase an amplitude of the adjustment wave in a first amplitude modification operation in response to an increase in an amplitude of the fundamental wave in a first range;

reduce the amplitude of the adjustment wave in a second amplitude modification operation in response to an increase in the amplitude of the fundamental wave in a second range;

switch between the first amplitude modification operation and the second amplitude modification operation in response to the amplitude of the fundamental wave exceeding a predetermined threshold between the first range and the second range;

add the adjustment wave to the fundamental wave to generate a phase voltage, wherein an initial phase of the adjustment wave prior to generating the phase voltage is offset from an initial phase of the fundamental wave so as to reduce a voltage ripple occurring in the DC bus at a frequency that is double the fundamental frequency of the fundamental wave; and output the phase voltage to generate the three-phase AC power.

2. The power conversion device according to claim 1, wherein a phase angle of the initial phase of the adjustment wave is less than four times a power factor angle of the three-phase AC power.

3. The power conversion device according to claim 1, wherein a phase angle of the initial phase of the adjustment wave is between 1.8 times and 2.2 times a power factor angle of the three-phase AC power.

4. The power conversion device according to claim 1, wherein the controller is configured to modify the amplitude of the adjustment wave to be between 0.5 times and 1.5 times the amplitude of the fundamental wave.

5. The power conversion device according to claim 1, wherein the controller is configured to gradually reduce the amplitude of the adjustment wave in the second amplitude modification operation such that the amplitude of each phase voltage is kept approximately equal to a voltage of the DC bus.

6. The power conversion device according to claim 1, wherein the controller is further configured to:
generate a boost command to raise the voltage of the DC bus in response to the increase in the amplitude of the fundamental wave, and
for each of the three inverters, raise the voltage of the DC bus in response to the boost command.

7. The power conversion device according to claim 1, further comprising a power source configured to generate an input AC voltage to be input to the inverters at a voltage amplitude greater than the amplitude of the fundamental wave,
wherein each of the three inverters comprises a rectifier circuit rectifying the input AC voltage and outputting the rectified voltage to the DC bus.

8. The power conversion device according to claim 1, wherein each of the three inverters comprises a series connected multi-level inverter in which AC sides of a plurality of inverter circuits are connected in series.

9. The power conversion device according to claim 6, wherein the controller is configured to switch between the first amplitude modification operation and the second amplitude modification operation in response to the amplitude of the fundamental wave exceeding a first reference value, and
wherein the boost command is generated in response to the amplitude of the fundamental wave exceeding a second reference value less than the first reference value.

10. The power conversion device according to claim 6, wherein the controller is configured to generate the boost command such that the voltage of the DC bus is equal to or greater than the amplitude of the phase voltage.

11. The power conversion device according to claim 9, wherein the controller is configured to raise an amplitude voltage value of the fundamental wave corresponding to the first reference value in response to the boost command.

12. A power conversion device comprising:
three inverters each of which is configured to convert DC power of a DC bus into single-phase AC power; and
a controller configured to control the three inverters so as to generate three-phase AC power,
wherein the controller is further configured to, for each of the three inverters:
generate a fundamental wave for generating one-phase AC power constituting the three-phase AC power, the fundamental wave having a fundamental frequency;
generate an adjustment wave having a frequency that is triple the fundamental frequency of the fundamental wave;
add the adjustment wave to the fundamental wave to generate a phase voltage, wherein an initial phase of the adjustment wave prior to generating the phase voltage is offset from an initial phase of the fundamental wave so as to reduce a voltage ripple occurring in the DC bus at a frequency that is double the fundamental frequency of the fundamental wave;
determine a difference in voltage between a maximum voltage associated with an amplitude of the phase voltage and a voltage of the DC bus;
subtract the difference in voltage from the amplitude of all the phase voltages; and
output the phase voltage to generate the three-phase AC power.

13. A power conversion method comprising:
generating a fundamental wave for generating one-phase AC power of three-phase AC power for each of three inverters configured to convert DC power of a DC bus into single-phase AC power, the fundamental wave having a fundamental frequency;
generating, for each of the three inverters, an adjustment wave having a frequency that is triple the fundamental frequency of the fundamental wave;
increasing an amplitude of the adjustment wave in a first amplitude modification operation in response to an increase in the amplitude of the fundamental wave;
reducing the amplitude of the adjustment wave in a second amplitude modification operation in response to an increase in the amplitude of the fundamental wave;
switching between the first amplitude modification operation and the second amplitude modification operation in response to the amplitude of the fundamental wave exceeding a predetermined threshold;
adding, for each of the three inverters, the adjustment wave to the fundamental wave to generate a phase voltage, wherein an initial phase of the adjustment wave is offset from an initial phase of the fundamental wave so as to reduce a voltage ripple occurring in the DC bus at double the fundamental frequency of the fundamental wave; and outputting, for each of the three inverters, the phase voltage to generate the three-phase AC power.

14. The method according to claim 13, wherein the amplitude of the adjustment wave is modified based on the amplitude of the fundamental wave so as to further reduce the voltage ripple.

15. The method according to claim 13, further comprising:

generating a boost command to raise the voltage of the DC bus in response to the increase in the amplitude of the fundamental wave, and for each of the three inverters, raising the voltage of the DC bus in response to the boost command.

16. A non-transitory memory device having instructions stored thereon that, in response to execution by a controller, cause the controller to perform operations comprising:

generating a fundamental wave for generating one-phase AC power of three-phase AC power for each of three inverters, each of the three inverters configured to convert DC power of a DC bus into single-phase AC power, the fundamental wave having a fundamental frequency;

generating, for each of the three inverters, an adjustment wave having a frequency that is triple the fundamental frequency of the fundamental wave;

increasing an amplitude of the adjustment wave in a first amplitude modification operation in response to an increase in the amplitude of the fundamental wave;

reducing the amplitude of the adjustment wave in a second amplitude modification operation in response to an increase in the amplitude of the fundamental wave;

switching between the first amplitude modification operation and the second amplitude modification operation in response to the amplitude of the fundamental wave exceeding a predetermined threshold;

adding, for each of the three inverters, the adjustment wave to the fundamental wave to generate a phase voltage, wherein an initial phase of the adjustment wave with respect to the fundamental wave is offset from an initial phase of the fundamental wave so as to reduce a voltage ripple occurring in the DC bus at double the fundamental frequency of the fundamental wave; and outputting, for each of the three inverters, the phase voltage to generate the three-phase AC power.

\* \* \* \* \*